United States Patent [19]

Righele

[11] Patent Number: 5,154,663
[45] Date of Patent: Oct. 13, 1992

[54] OPERATING DEVICE FOR THE HOPPER OF A ROTARY PUMP FOR PACKING GROUND MEAT

[76] Inventor: Giovanni B. Righele, Via Tiziano, 5 - 36010 Zane' (Vicenza), Italy

[21] Appl. No.: 794,984

[22] Filed: Nov. 19, 1991

[30] Foreign Application Priority Data

Nov. 23, 1990 [IT] Italy .................. 22173/90[U]

[51] Int. Cl.$^5$ .................. F04C 2/00; A22C 11/08
[52] U.S. Cl. .................. 452/41; 418/231; 452/30
[58] Field of Search .............. 452/30, 41, 40, 183; 418/231

[56] References Cited

U.S. PATENT DOCUMENTS

| 3,013,650 | 12/1961 | Toby | 452/41 |
| 3,922,755 | 12/1975 | Righele et al. | 452/41 |
| 4,313,240 | 2/1982 | Righele et al. | 452/41 |
| 4,694,536 | 9/1987 | Townsend | 452/41 |
| 4,821,377 | 4/1989 | Ualiani | 452/41 |
| 4,823,439 | 4/1989 | Schnell | 452/41 |

FOREIGN PATENT DOCUMENTS 2455436 11/1980 France .................. 452/41

Primary Examiner—Willis Little
Attorney, Agent, or Firm—Eckert Seamans Cherin & Mellott

[57] ABSTRACT

The device comprises means suitable for operating in rotation a lower annular portion of a hopper provided with a delivery unit suitable for allowing the progressive delivery of meat in a rotary pump for packing ground meat. The transmission means comprise a ring constituting the lower annular portion of the hopper and made in a single piece with a gear, arranged round a fixed bush, suitable for receiving the rotary motion from a pinion located at the upper extremity of the pump's driving shaft.

2 Claims, 2 Drawing Sheets

OPERATING DEVICE FOR THE HOPPER OF A ROTARY PUMP FOR PACKING GROUND MEAT

DESCRIPTION

The present invention relates to an operating device for the hopper of a rotary pump for packing ground meat.

A known packing pump of the rotary type, such as that described in the Italian utility model No. 208083 filed on Dec. 17, 1985, comprises a stator and a rotor rotatably housed in it so as to define an annular pumping chamber which is placed in communication with a hopper by means of a supply mouth and with a packing gut by means of a delivery mouth for the meat.

Said rotor comprises an annular portion, integral with a driving shaft, provided with radial passages for a plurality of pumping vanes which can slide vertically in them due to the effect of the engagement of their lower, and possibly upper, extremities with respective fixed cams provided for in the bottom of said pump chamber and possibly in the cover.

In a pump of that type the loading hopper is normally provided with a screw-driven delivery unit suitable for delivering the product itself inside the pump chamber.

As described in detail in the Italian utility model No. 212008 filed on Oct. 16, 1987 the screw-driven delivery unit is rotated, through means for the transmission of motion, by the upper extremity of the driving shaft. Said means for the transmission of motion, in particular, comprise a gear which circumscribes the lower part of the hopper and is suitable for receiving motion from a pinion keyed on the upper extremity of the driving shaft and for transmitting it through a connecting sleeve to an annular rotating portion of the hopper, to which the screw-driven delivery unit is fastened.

The abovementioned system for transmitting motion from the driving shaft to the annular rotating portion of the hopper has some drawbacks.

First of all it is somewhat complicated since three pieces connected together are necessary for its accomplishment.

In addition the sturdiness of such transmission of motion is limited by the distance exiting between the gear and the rotating portion of the hopper.

A further drawback refers to the fact that the hopper has a lower part with a large diameter under which the pumping vanes are normally in operation. It is therefore necessary to arrange for the presence of safety systems suitable for preventing staff operating the pump from inadvertently introducing their fingers in the proximity of the vanes while the pump is in operation.

In the systems so far adopted such safety is attained by providing for the periodic stoppage of the machine in all the cases wherein it is necessary for the operator to gain access to the inside of the hopper.

The production cycle's stoppage takes place in different ways according as to whether the hopper is open at the top or whether there is an upper closing grille.

In the first case the stoppage is operated by microswitches arranged, say, on the ladder giving access to the hopper and operated by the passage of an operator, while in the second case, it is directly operated by the removal of the covering grille, an operation that is necessary for reloading the meat.

In both cases the safety of the pump is obtained by giving up the continuity of the production process.

The object of the present invention is to accomplish an operating device for the hopper of a rotary pump for packing ground meat, that is simple, compact and safe.

According to the present invention such objects are attained through an operating device for the hopper of a rotary pump for packing ground meat comprising a pumping chamber defined by a stator and by a rotor provided with a driving shaft and rotatably housed in said stator, a hopper for the delivery of ground meat in said pumping chamber, a mouth for the delivery of ground meat from said pumping chamber to a packing gut and means for the transmission of motion from said driving shaft to a rotating annular portion of said hopper, said means for the transmission of motion comprising a gear fastened to said annular portion and in engagement with a pinion fastened to the upper extremity of the driving shaft, characterized in that said gear and said annular rotating portion of the hopper are placed one near the other and are in one piece.

In this way a simple, compact and safe device has been accomplished.

In particular, simplicity is attained through the use of a single piece as the means for the transmission of motion from the driving shaft to the delivery unit.

Compactness derives on the other hand from the proximity between the gear and the annular rotating portion of the hopper.

Safety is lastly obtained thanks to the fact that the proximity between the gear and the annular rotating portion of the hopper allows the introduction, inside said gear, of a bush capable of restricting and extending the port providing access to the rotor and thus preventing the insertion of the operator's fingers so that they do not reach the pumping vanes. No stoppage of the machine's operation is thus required.

The features of the present invention shall be made more evident by an embodiment, illustrated as a non-limiting example in the enclosed drawings, wherein.

Figure 1:
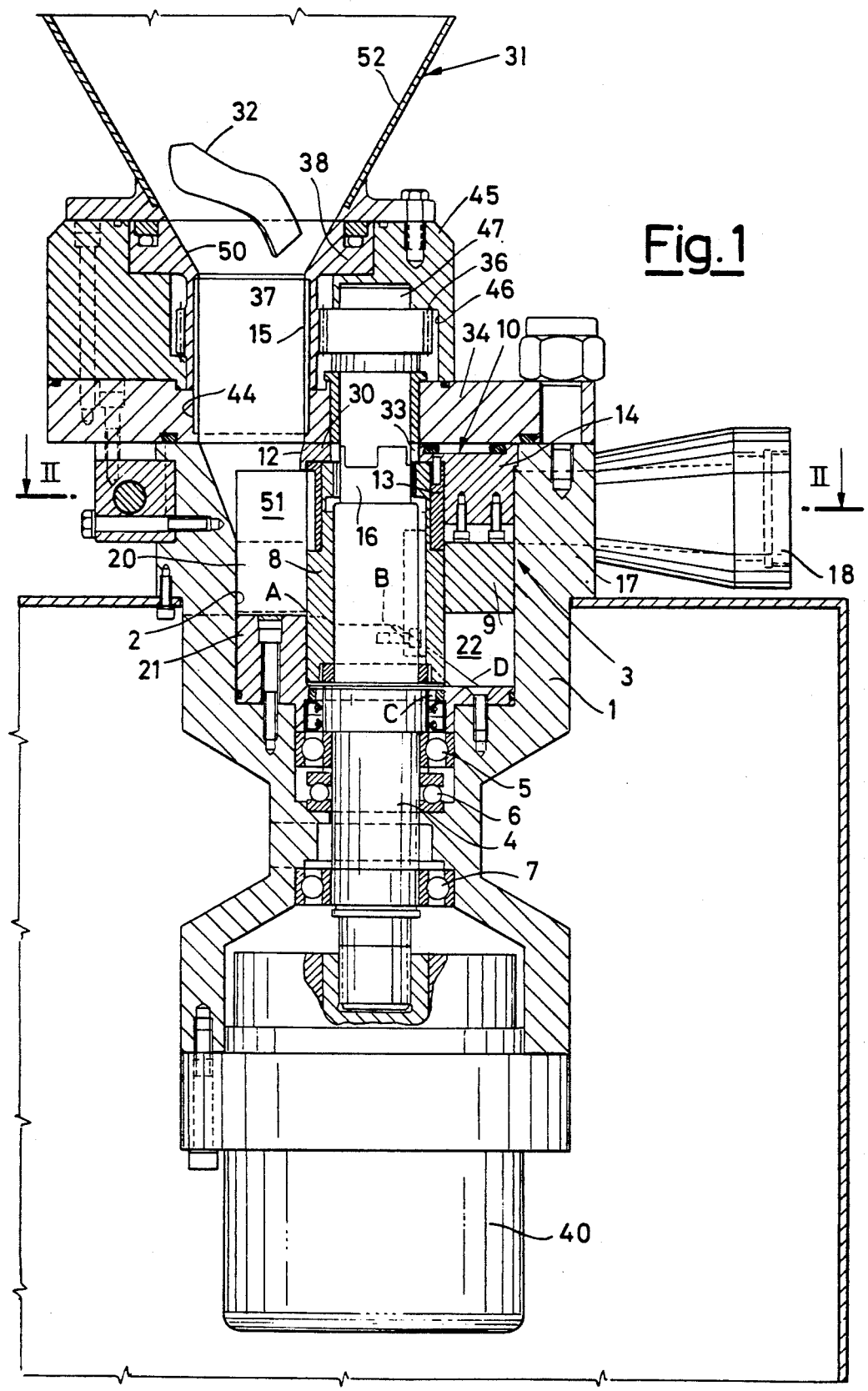
FIG. 1 shows a device according to the invention in a sectional view taken along the line I—I of FIG. 2.

With reference to the drawings, there is shown a rotary pump for packing ground meat, comprising a stator 1 defining a cylindrical cavity 2 and a rotor 3 rotatably housed in said cylindrical cavity 2 of the stator 1. To provide the rotation of the rotor 3, in the direction of the arrow F of FIG. 2, there is provided a driving shaft 4 connected to a motor 40 and supported by the stator 1 by means of bearings 5, 6, 7.

The rotor 3 consists of a central cylindrical part 8 and of a peripheral annular part having a lower height 9. The cylindrical cavity 2 is closed at the top by a cover 10 including a first hole 12, an annular collar 13 arranged with clearance round the central part 8 of the rotor 3, a radial sector 14 with the lower extremity in grazing contact with the upper extremity of the peripheral part 9 of the rotor 3, a second hole 33 for the passage of the intermediate part 16 of the driving shaft 4 and a fixed annular cam 30 (FIG. 2), whose objects shall be explained later. On the cover 10, at the first hole 12, there is a loading hopper 31 provided with a screw-operated delivery unit 32 and divided into a fixed upper part 52 and a rotating lower annular portion 50.

The cover 10 is clamped by means of a closing plate 34 having a passage 44 in communication with the lower rotating part 50 of the hopper 31. Inside the rotating part 50 and the passage 44 there is a fixed bush 15 suitable for operating the narrowing of the port providing passage for the hopper 31, say, down to a diameter of 6 cm for a length of 11 cm, and thus preventing the access of a hand from the outside.

Over the closing plate 34 there is superimposed a further cover 45. In it there is obtained a cavity 46 for housing the upper extremity 47 of the driving shaft 4, on which a pinion 36 is fastened. The latter engages a gear 37 arranged round the fixed bush 15. The gear 37 is arranged in the immediate proximity and is made of a single piece with a ring 38 which forms the intermediate annular portion 50 of the hopper 31.

Figure 2:
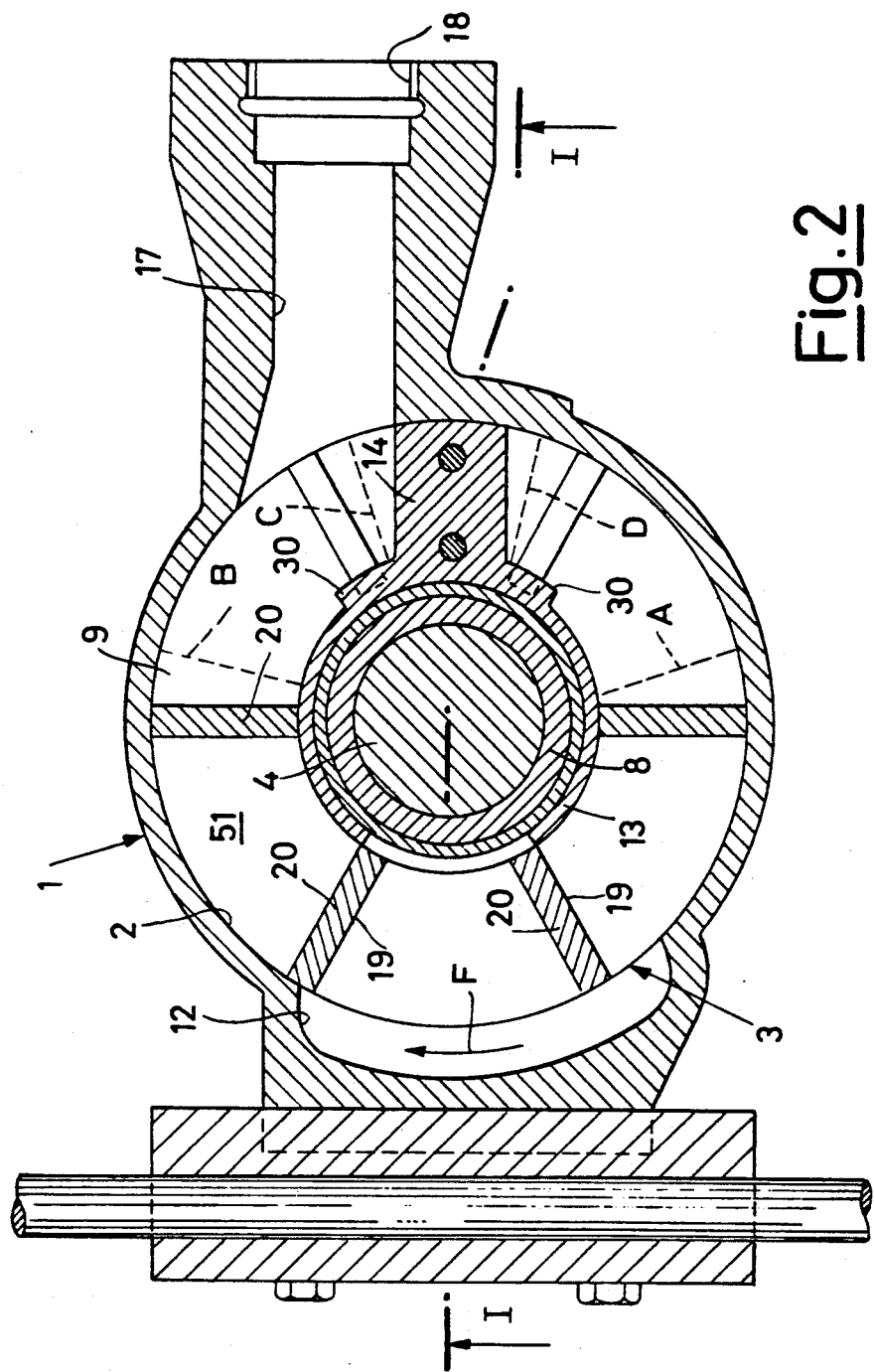
FIG. 2 shows said device in a transversal sectional view taken along the line II—II of FIG. 1.

As can be seen from FIGS. 1 and 2, between the stator 1, the stator 3 and the cover 10 there is defined an upper annular chamber 51, that is provided with a filling mouth coincident with the hole 12 of the cover 10 and with a delivery mouth 17 with a squared outlet 18, on which the gut to be filled with ground meat delivered by the pump is destined to be fitted. The radial sector 14 is located immediately downstream from the delivery mouth 17 to act as a dividing wall of the annular cavity 51.

In the peripheral part 9 of the rotor 3 there are obtained six equally-spaced radial passages 19 (FIG. 2), in which pumping vanes 20 are slidably housed that are caused alternately to move in and out of said peripheral part 9 according to a pre-set programme defined by the upper annular cam 30 already described, against which the upper extremities of the vanes 20 slide, and by a complementary fixed lower annular cam 21, which is housed in a lower annular opening 22 defined between the peripheral part 9 of the rotor 3 and the bottom of the cylindrical chamber 2 of the stator 1 and supports in sliding contact the lower extremities of the vanes 20.

As shown in FIGS. 1 and 2, the lower annular cam 21 comprises a raised flat part A-B which extends from a point A upstream from the filling mouth 12 to a point B upstream from the delivery mouth 17, a descending part B-C substantially coincident with the delivery mouth 17, a lowered flat part C-D which extends from the already mentioned point C to a point D downstream from the dividing sector 14, and lastly an ascending part D-A. As a consequence, the pumping vanes 20 move outward to the greatest extent from the peripheral part 9 of the rotor 3 in the section A-B, which comprises the filling mouth 12 and arrives in the proximity of the delivery mouth 17, and then descend progressively in the part B-C to disappear altogether and pass under the dividing sector 14 in the part C-D, that is in the area coincident with the delivery mouth 17 when they are required not to hinder the pumping action of the successive vane 20. The upper cam 30, as already said, is complementary to the lower cam 21.

The described pump operates as follows. As a consequence of the upward and downward motion imparted to the vanes 20 by the complementary cams 21 and 30 the part of the upper annular chamber 51 that is between the points A and B is divided into a plurality of compartments, in each of which a given quantity of ground meat is delivered by the filling mouth 12.

Due to the effect of the rotary motion of the rotor 3 such given quantities of meat are conveyed by the pumping vanes 20 in the rear towards the delivery mouth 17, performing in the last part of their run along the annular chamber 51 a displacement that is almost rectilinear and without obstacles, which prevents slushing, grinding or chopping the meat.

Simultaneously the driving shaft 4, by means of the pinion 36, causes the rotation of the gear 37 and with it that of the ring 38, that is the intermediate annular portion 50 of the hopper 31 and thus of the delivery unit 32 which, in turn, urges the product in a continuous and homogeneous manner toward the mouth 12. The speed of rotation of the delivery unit 32 is suitably regulated by giving an adequate size to the pinion 36 and the gear 37.

It is easy to see that the system for the transmission of motion from the driving shaft 4 to the intermediate annular portion 50 of the hopper 31 is particularly simple and compact since it takes place through a gear 37 and a ring 38 formed in a single piece one next to the other.

I claim:

1. Operating device for the hopper of a rotary pump for packing ground meat comprising a pumping chamber defined by a stator and by a rotor provided with a driving shaft and rotatably housed in said stator, a hopper for the delivery of ground meat in said pumping chamber, a mouth for the delivery of ground meat from said pumping chamber to a packing gut and means for the transmission of motion from said driving shaft to a rotating annular portion of said hopper, said means for the transmission of motion comprising a gear fastened to said annular portion and in engagement with a pinion fastened to the upper extremity of the driving shaft, characterized in that said gear and said annular rotating portion of the hopper are placed one near the other and are made in one piece.

2. Device according to claim 1, characterised in that it comprises a fixed bush arranged inside said gear to operate a narrowing of the port providing access to the rotor.

* * * * *